United States Patent
Sah et al.

(10) Patent No.: US 7,034,905 B2
(45) Date of Patent: Apr. 25, 2006

(54) LIQUID CRYSTAL DISPLAY PANEL HAVING A REPAIR LINE POSITIONED ONLY UNDERNEATH THE SECOND PORTION OF THE NON-DISPLAY AREA

(75) Inventors: Wen-Jyh Sah, Tai-Nan Hsien (TW); Chin-Cheng Chien, Tai-Nan Hsien (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 16 days.

(21) Appl. No.: 10/463,553

(22) Filed: Jun. 18, 2003

(65) Prior Publication Data

US 2004/0070700 A1 Apr. 15, 2004

(30) Foreign Application Priority Data

Oct. 9, 2002 (TW) ............................... 91123367 A

(51) Int. Cl.
G02F 1/1333 (2006.01)

(52) U.S. Cl. ........................... 349/54; 349/42; 349/139; 349/149; 349/152

(58) Field of Classification Search .................. 349/54, 349/11, 42, 139, 110, 111, 149–152
See application file for complete search history.

(56) References Cited

U.S. PATENT DOCUMENTS 5,600,460 A * 2/1997 Yamamoto et al. ........... 349/54
6,639,634 B1 * 10/2003 Zhang et al. .................. 349/54

* cited by examiner

Primary Examiner—Andrew Schechter
Assistant Examiner—George Y. Wang
(74) Attorney, Agent, or Firm—Winston Hsu

(57) ABSTRACT

A liquid crystal display panel is provided. The LCD panel has a first substrate having at least a conductive material layer thereon, a second substrate having at least a repair line positioned in a predetermined area, and a liquid crystal layer positioned between the first substrate and the second substrate. The predetermined area is underneath the first substrate excluding the portions having the conductive material layer, thus reducing RC delay of the repair line.

16 Claims, 4 Drawing Sheets

LIQUID CRYSTAL DISPLAY PANEL HAVING A REPAIR LINE POSITIONED ONLY UNDERNEATH THE SECOND PORTION OF THE NON-DISPLAY AREA

BACKGROUND OF INVENTION

1. Field of the Invention

The invention relates to a liquid crystal display (LCD) panel, and more particularly, to an LCD panel with at least a repair line structure.

2. Description of the Prior Art

A traditional LCD panel comprises a thin-film transistor (TFT) substrate, a color filter (CF) substrate, and a liquid crystal layer positioned between the TFT substrate and the CF substrate. The TFT substrate contains a plurality of matrix pixels, which consist of a plurality of datalines and a plurality of scan lines, and a plurality of pixel driving circuits consisting of a plurality of electric components, such as thin-film transistors and capacitors. The pixel driving circuits are positioned on the intersections of each data line and each scan line for receiving an image data signal transmitted by the data line and a switching/addressing signal transmitted by the scan line to control operation of each pixel. For avoiding disconnection of data lines or scan lines which cause the failure of signal transmission, the method according to the prior art is to set a plurality of repair lines in the area around the LCD panel. Thus external image data signals or switching/addressing signals are capable of passing through the repair lines to control operation of pixels, and this will avoid the defects of the LCD panel caused by disconnecting data lines.

Please refer to FIG. 1, which is a structure of a prior-art LCD panel 10. As shown in FIG. 1, an LCD panel 10 contains a display area 12 and a non-display area 14 surrounding the display area 12. The display area 12 contains a plurality of matrix pixels 16, which consist of a plurality of data lines 20 and a plurality of scan lines 30, and a plurality of pixel driving circuits consisting of a plurality of electric components, such as thin-film transistors and capacitors. The pixel driving circuits are positioned on the intersections of each data line 20 and each scan line 30. The non-display area 14 contains some package testing materials, such as main sealants, electric components, and repair lines.

Please refer to FIG. 2, which is a section view of the prior-art LCD panel 10. As shown in FIG. 2, the prior-art LCD panel 10 contains a lower substrate (often called a TFT substrate) 40, an upper substrate (often called a CF substrate) 46 covering the lower substrate 40, a liquid crystal layer (not shown in FIG. 2) positioned between the lower substrate 40 and the upper substrate 46 in the display area 12, and a main sealant 52 positioned between the lower substrate 40 and the upper substrate 46 in the non-display area 14 for binding the two substrates. On the lower substrate 40 are a plurality of repair lines 42 in the non-display area 14 and a passivation layer 44, such as a silicon nitride layer, covers on the display area 12 and the non-display area 14. On the surface of the upper substrate 46 are a black matrix 48 in the non-display area 14 and a conductive material layer 50, such as an indium tin oxide (ITO) layer, in both display area 12 and non-display area 14 for being a transparent electrode.

In the structure of the prior-art LCD panel, the conductive material layer 50 completely covers the surface of the upper substrate 46, including the display area 12 and the non-display area 14, and therefore the conductive material layer 50 in the non-display area 14, the repair lines 42 underneath the conductive material layer 50, and the liquid crystal will form a capacitance. The formation of the capacitance causes an RC delay effect to the repair line, and the RC delay decreases the successful rate of using a repair line to repair a disconnecting wire. As the large size LCD panels are developed, to efficiently decrease the RC delay on the repair lines has become an important issue for increasing the yield of the production.

SUMMARY OF INVENTION

It is therefore an objective of the present invention to provide an LCD panel that can decrease the RC delay of the repair lines and increase the successful rate of utility of the repair lines.

According to the claimed invention, the LCD panel contains a first substrate having at least a conductive material layer thereon, a second substrate having at least a repair line thereon, and a liquid crystal layer positioned between the first substrate and the second substrate. The repair line is positioned in a predetermined area underneath the first substrate excluding portions having the conductive material layer, and the repair line repairs a disconnecting line on the second substrate so that an external signal, which is predetermined to transmit to the line, is capable of passing through the repair line to the line.

It is an advantage of the claimed invention that the repair line of the LCD panel is positioned in the area underneath the first substrate excluding portions having the conductive material layer so that it avoids the liquid crystal to form the capacitances between the repair line and the conductive material layer, which decreases the RC delay on the repair line and further increase the successful rate of utility of the repair line and the yield of the LCD panel.

These and other objectives of the present invention will no doubt become obvious to those of ordinary skill in the art after reading the following detailed description of the preferred embodiment that is illustrated in the various figures and the drawings.

DETAILED DESCRIPTION

Figure 1:
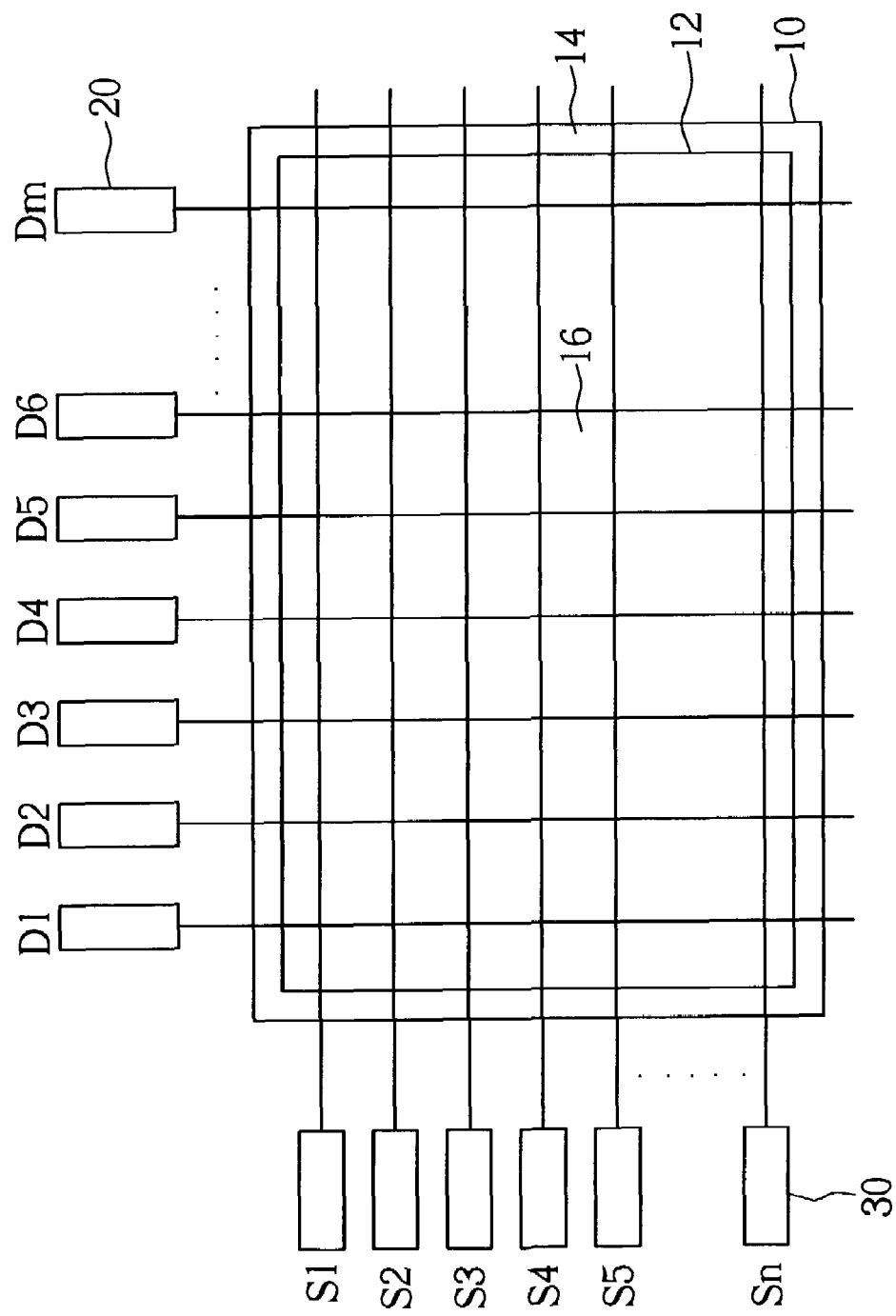
FIG. 1 is a structure of a prior-art LCD panel.
Figure 2:
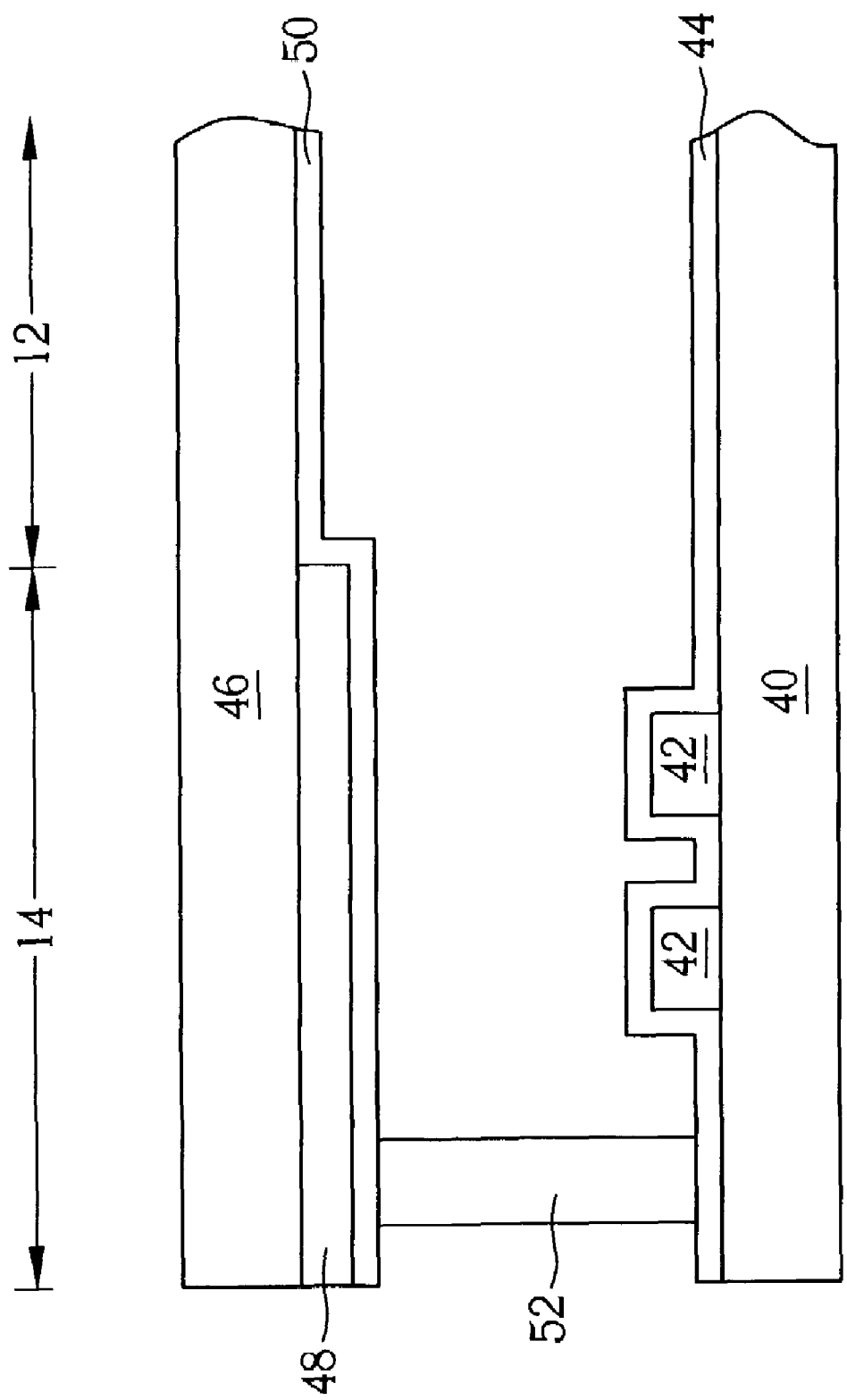
FIG. 2 is a section view of the prior-art LCD panel shown in FIG. 1.
Figure 3:
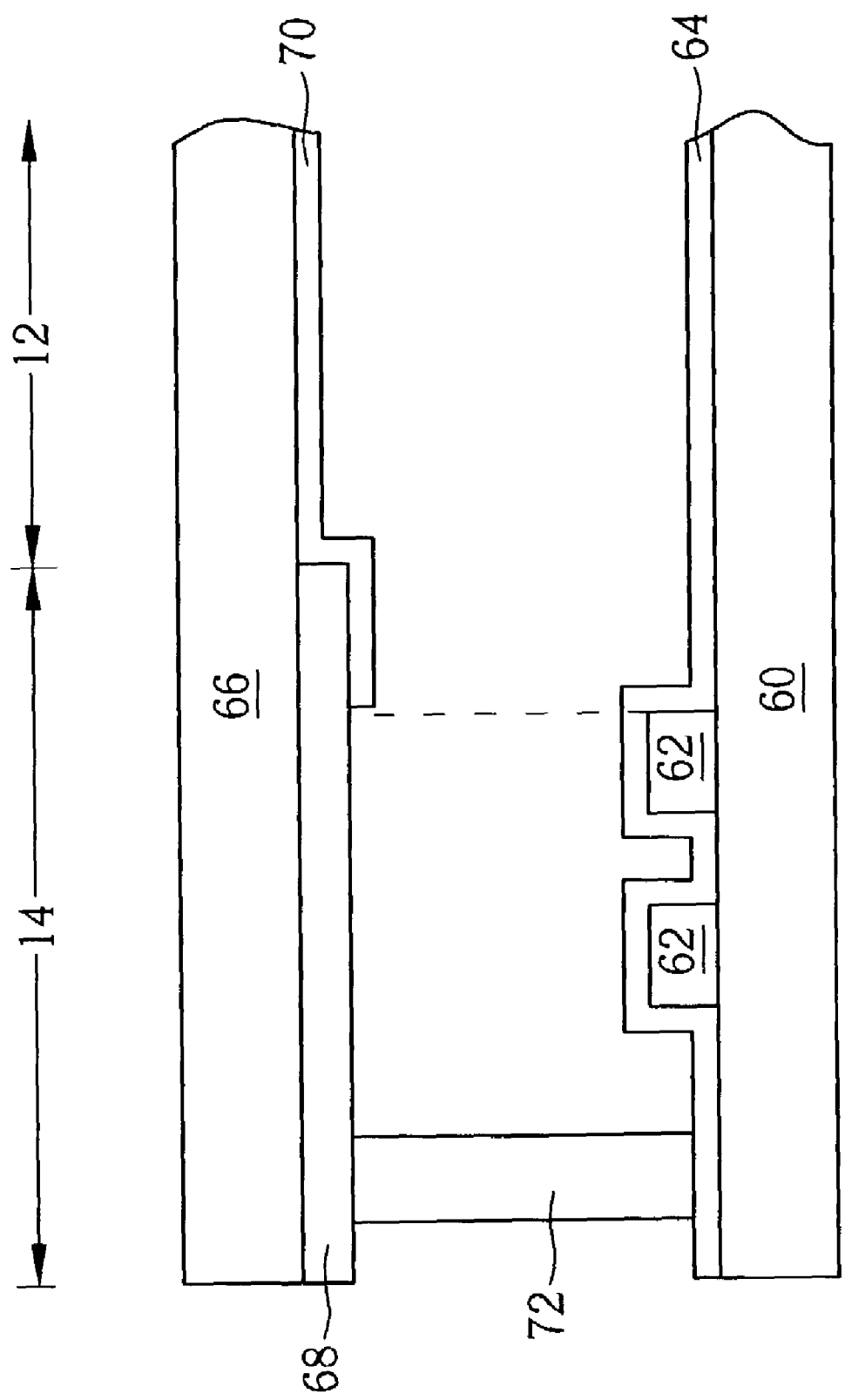
FIG. 3 is a section view of an LCD panel according to a first preferred embodiment of the present invention.

Please refer to FIG. 3. FIG. 3 is a section view of an LCD panel according to the first preferred embodiment of the present invention. The LCD panel of the present invention contains a lower substrate (often called a TFT substrate) 60, an upper substrate (often called a CF substrate) 66 covering the lower substrate 60, a liquid crystal layer (not shown in FIG. 3) positioned between the lower substrate 60 and the upper substrate 66 in a display area 12, and a main sealant 72 positioned between the lower substrate 60 and the upper substrate 66 in a non-display area 14 for binding the two substrates.

On the lower substrate 60 are formed a plurality of matrix pixels, which consist of a plurality of data lines and a plurality of scan lines, in the display area 12, and a plurality of pixel driving circuits positioned on the intersections of each data line and each scan line for controlling the operation of pixels of the LCD panel. The pixel driving circuits consist of a plurality of electric components, such as thin-film transistors and capacitances. In addition, the lower substrate 60 further comprises a plurality of repair lines 62 in the non-display area 14, and the repair lines 62 enclose the TFT pixels in the display area 12 for repairing a disconnecting line, such as a data line, on the lower substrate 60 to transmit an external signal passing through the repair lines 62 to the corresponding pixels. A passivation layer 64, such as a silicon nitride layer, covers the pixel driving circuits and repair lines 62.

The surface of the upper substrate 66 has a black matrix 68 in the non-display area 14 and a conductive material layer 70 covering the display area 12 and portions of the non-display area 14. The black matrix 68 is an opaque layer made by an insulating material. The conductive material layer 70 serves as a transparent electrode, which is formed by a transparent conductive material, such as ITO. It should be noted that the conductive material layer 70 should not be positioned in an area over portions of the lower substrate 60 where the repair lines 62 are. For the reason of avoiding liquid crystal capacitances, as well as the RC delay, formed by the conductive material layer 70 and the repair lines 62, one can use a shadow mask or a photolithography process to define at least a pattern of the conductive material in the area on the surface of the upper substrate 66 excluding portions right over the repair lines 62. A main sealant 72 is positioned outside of the repair lines 62 or covers some repair lines 62.

Figure 4:
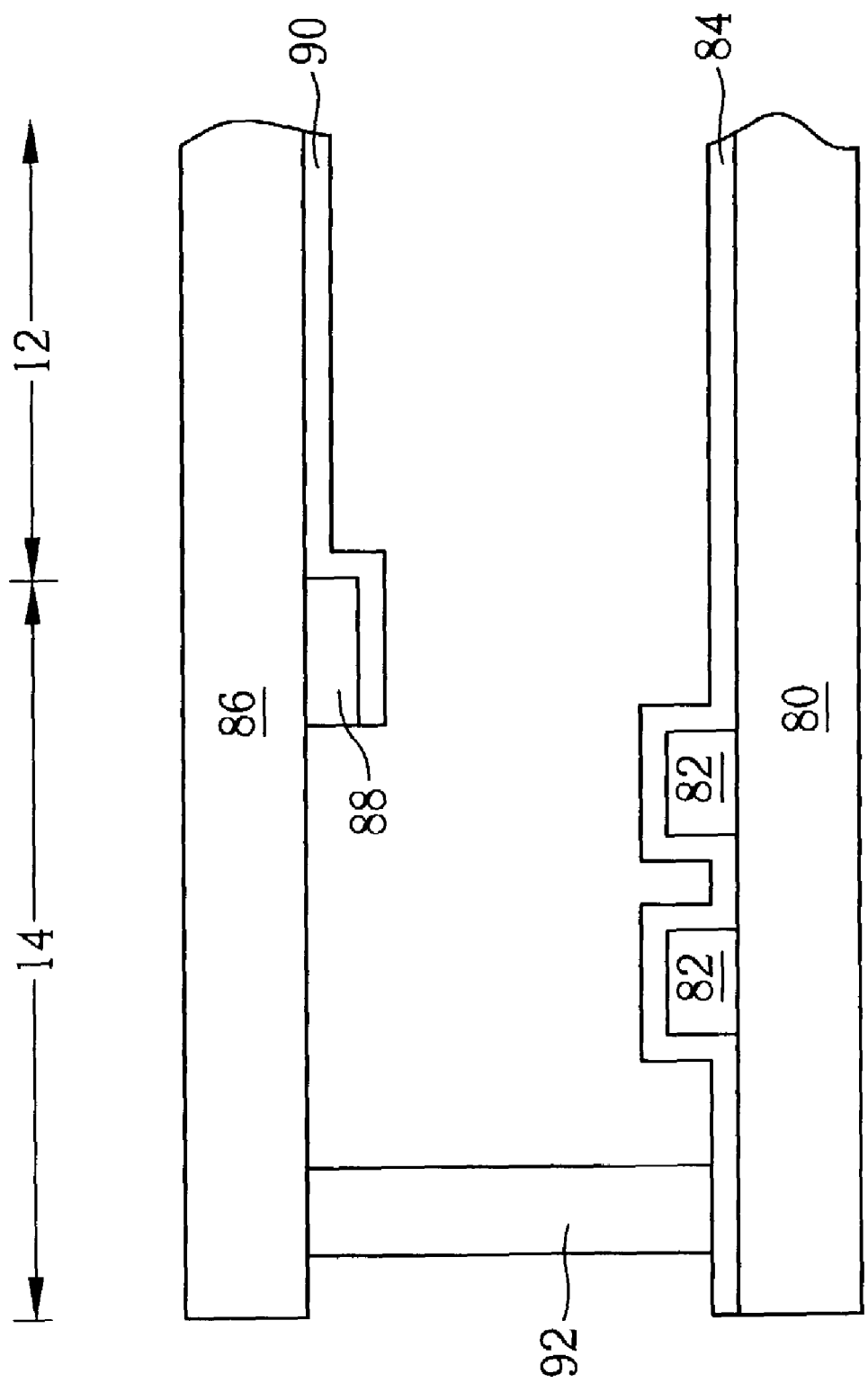
FIG. 4 is a section view of an LCD panel according to a second preferred embodiment of the present invention.

Please refer to FIG. 4, which is a section view of an LCD panel according to the second preferred embodiment of the present invention. As shown in FIG. 4, the LCD panel of the present invention contains a lower substrate (often called a TFT substrate) 80, an upper substrate (often called a CF substrate) 86 covering the lower substrate 80, a liquid crystal layer (not shown in FIG. 4) positioned in a display area 12 between the lower substrate 80 and the upper substrate 86, and a main sealant 92 positioned in a non-display area 14 between the lower substrate 80 and the upper substrate 86 for binding the two substrates.

On the lower substrate 80 are formed matrix pixels, which consist of a plurality of data lines and a plurality of scan lines, in the display area 12 and a plurality of pixel drivers positioned on the intersections of each data line and each scan line for controlling operation of pixels of the LCD panel, wherein the pixel drivers consist of a plurality of electric components, such as thin-film transistors and capacitances. In addition, the lower substrate 80 further comprises a plurality of repair lines 82 in the non-display area 14, and the repair lines 82 surround the TFT pixels in the display area 12 for repairing a disconnecting line, such as a data line, on the lower substrate 80 to transmit an external signal passing through the repair lines 82 to corresponding pixels. A passivation layer 84, such as a silicon nitride layer, covers the pixel driving circuits and repair lines 82.

The surface of the upper substrate 86 has a black matrix 88 in the non-display area 14 and a conductive material layer 90 covering the display area 12 and portions of the non-display area 14. The black matrix 88 is an opaque layer and made by an insulating material or a conductive material, such as chromium, $Cr_2O_3$, or CrN. The conductive material layer 90 serves as a transparent electrode and made by transparent conductive materials, for example by ITO. The conductive material layer 90 should not be positioned in an area over portions of the lower substrate 80 where the repair lines 82 are. For the reason of avoiding the formation of the liquid crystal capacitances, formed by the black matrix 88, the conductive material layer 90, and the repair lines 82, and of the RC delay on the repair lines, one can use a shadow mask or a photolithography process to define at least a pattern of the conductive material in the area on the surface of the upper substrate 86 excluding portions right over the repair lines 82. A main sealant 92 is positioned in the non-display area 14, for example outside of the black matrix 88, and covers the surface of the lower substrate 80 outside of the repair lines 82 or covers some repair lines 82.

For saving the lead time of injecting liquid crystal when fabricating large size LCD panels, currently the liquid crystal layer is filled between the upper substrate and lower substrate by the way of One Drop Filling (ODF), and a main sealant UV exposure area is set on the edge of the upper and lower substrate in advance. Then ultraviolet light is used to solidify the main sealant, which is positioned in the main sealant UV exposure area, for binding and fixing the two substrates. In the second preferred embodiment of the present invention, the black matrix 88 avoids the area right over the repair line 82 so that the main sealant 92 and repair lines 82 are set in a transparent area. More specifically, the fabrication of the LCD panel of the present invention is capable of applying to ODF method, setting the black matrix and the transparent electrode on the surface of the upper substrate outside of the main sealant transparent area, and positioning repair lines on the lower substrate in the main sealant transparent area. As a result, the conductive materials, such as the black matrix and the transparent electrode, are not positioned above the repair lines so that the RC delay caused by the formation of liquid crystal capacitances, formed between the conductive materials and repair lines, can be avoided effectively.

In contrast to the prior art, the present invention LCD panel provides a pattern of the conductive materials, such as the black matrix and the transparent electrode, on the surface of the upper substrate avoiding portions right over repair lines. Thus the liquid crystal capacitances between the repair lines and the conductive material patterns will be avoided, and it will avoid the RC delay interfering with the signals transmitted by repair lines. Furthermore, the present invention improves the successful rate of the utility of repair lines and the yield of the LCD panel.

Those skilled in the art will readily observe that numerous medications and alterations of the device may be made while retaining the teachings of the invention. Accordingly, the above disclosure should be construed as limited only by the mate and bounds of the appended claims.

What is claimed is:

1. An LCD panel comprising:
   a first substrate comprising a display area and a non-display area including a first portion and a second portion;
   at least a conductive material pattern positioned in the display area and only in the first portion, excluding the second portion, of the non-display area of the first substrate;
   a second substrate having at least a repair line thereon, positioned in a predetermined area underneath the second portion of the non-display area of the first substrate, wherein the repair line repairs a disconnecting wire on the second substrate so that an external signal, which is predetermined to transmit to the wire, is capable of passing through the repair line to the wire, the repair line being positioned only underneath the second portion of the non-display area; and a liquid crystal layer positioned between the first substrate and the second substrate.

2. The LCD panel of claim 1 wherein the first substrate is a CF substrate.

3. The LCD panel of claim 1 wherein the conductive material pattern is a transparent electrode.

4. The LCD panel of claim 3 wherein the conductive material pattern is defined by a shadow mask.

5. The LCD panel of claim 3 wherein the conductive material pattern is defined by a photolithography process.

6. The LCD panel of claim 1 wherein the first substrate further comprises a black matrix positioned in the first portion of the non-display area.

7. The LCD panel of claim 1 wherein the first substrate further comprises a main sealant positioned in the second portion of the non-display area for binding the first substrate and the second substrate.

8. The LCD panel of claim 7 wherein the main sealant covers the repair line.

9. The LCD panel of claim 7 wherein the main sealant covers a surface of the second substrate adjacent to the repair line.

10. The LCD panel of claim 1 wherein the second substrate is a TFT substrate.

11. The LCD panel of claim 1 wherein the second substrate has a plurality of thin-film transistors thereon for controlling operation of the pixels of the LCD panel.

12. The LCD panel of claim 11 wherein the predetermined area encloses the thin-film transistors.

13. The LCD panel of claim 1 wherein the line is a data line, and the external signal is a data signal.

14. The LCD panel of claim 1 wherein the liquid crystal layer is filled between the first substrate and the second substrate by the way of ODF (One Drop Filling).

15. The LCD panel of claim 6 wherein the conductive material pattern covers at least a portion of the black matrix.

16. The LCD panel of claim 9 wherein the repair line is positioned between the main sealant and the display area.

* * * * *